INVENTORS
ROBERT P. CROW &
DOV MALKIN
BY Floyd M. Harris
Attorney

May 16, 1967

R. P. CROW ET AL 3,320,612

DME WITH STEPPER TYPE SERVO MOTOR

Filed Aug. 17, 1965

INVENTORS
ROBERT P. CROW &
DOV MALKIN
BY
Floyd M. Harris
Attorney

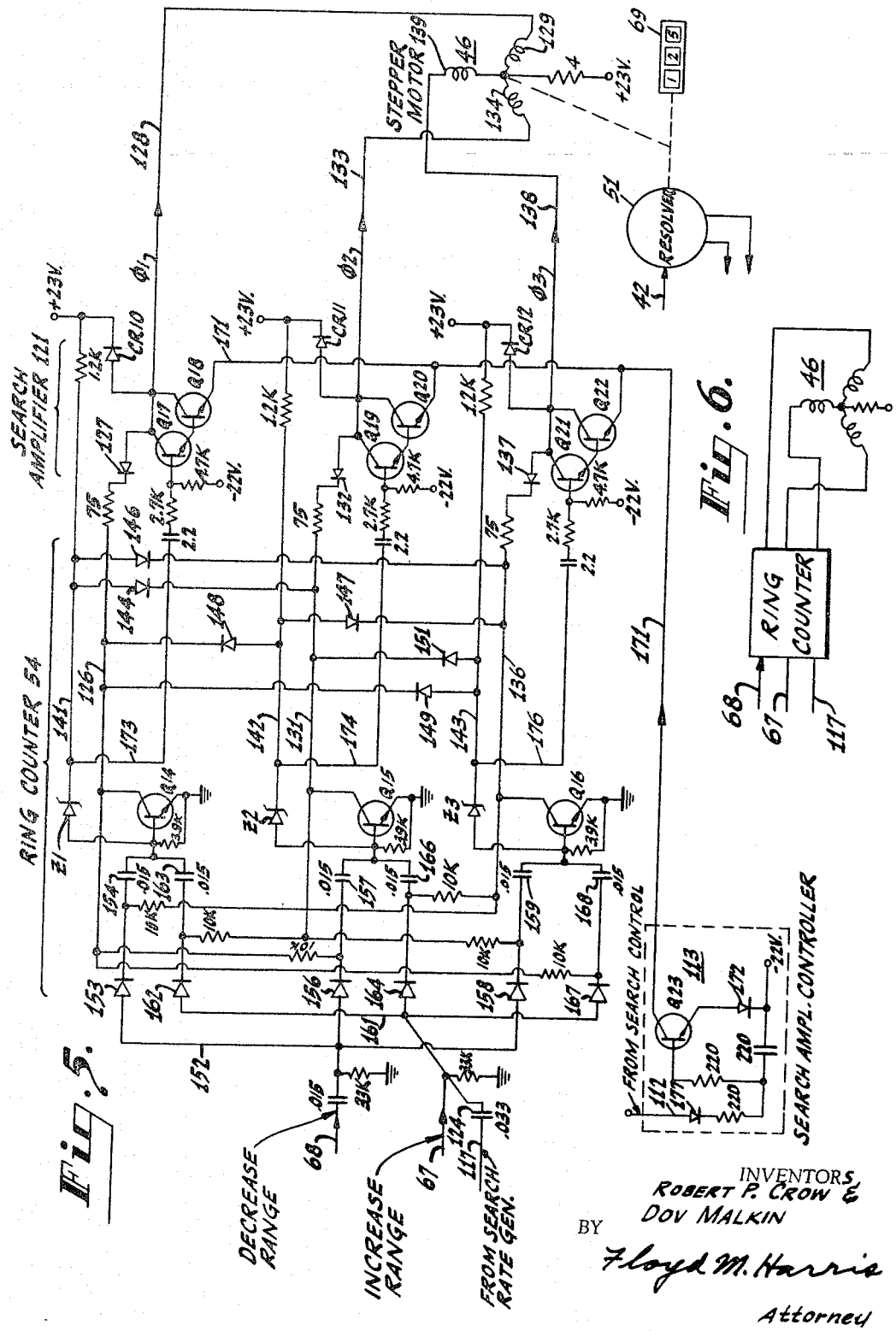

United States Patent Office 3,320,612
Patented May 16, 1967

3,320,612
DME WITH STEPPER TYPE SERVO MOTOR
Robert P. Crow and Dov Malkin, Los Angeles, Calif., assignors to Radio Corporation of America, a corporation of Delaware
Filed Aug. 17, 1965, Ser. No. 480,465
10 Claims. (Cl. 343—7.3)

Our invention relates to radar systems for determining distance and particularly to improved Distance Measuring Equipment (DME).

DME is airborne radar equipment of the pulse type which interrogates a selected ground beacon or transponder to initiate a reply. The DME receives the reply from the beacon and gives the pilot a reading of the distance from the aircraft to the ground beacon. The DME automatically searches in range by means of a range gate, and then locks into automatic track-in-range upon reception of the several reply pulses that are coincident in time with the range gate.

An object of the invention is to provide improved Distance Measuring Equipment.

A further object of the invention is to provide improved Distance Measuring Equipment that may be manufactured at a comparatively low cost.

A further object of the invention is to provide Distance Measuring Equipment that has an extremely fast search in range and that can be manufactured at a comparatively low cost.

A still further object of the invention is to provide improved Distance Measuring Equipment having minimum acceleration and velocity errors.

A still further object of the invention is to provide improved Distance Measuring Equipment in which random large error replies will have a minimum effect on its range accuracy.

In the embodiment of the invention described herein, the range gate is driven by a stepper motor (a three-phase motor in this example) rather than by the usual servo motor. More specifically it is a stepper motor that drives a resolver from which resolved or delayed pulses are obtained to produce the range gate which is shifted in its timing as the resolver is rotated.

The stepper motor is rotated in one direction or the other by the output of a ring counter, the direction depending upon the direction or sequence of the ring counter operation. The ring counter is operated in one direction if pulses appear on one of two input leads; it is operated in the other direction if pulses appear on the other of the two input leads.

The direction of operation of the ring counter, and, therefore, of the stepper motor, is controlled by a range error detector which supplies reply pulses to one ring counter input lead when the range gate is to be driven in the increase-range direction (to maintain coincidence with reply pulses), and which supplies reply pulses to the other ring counter input lead when the range gate is to be driven in the decrease-range direction. The stepper motor in the present example makes one rotational step of 15 degrees for each input pulse applied to the ring counter.

The DME has four modes of operation which are (1) Track Mode, (2) Proportional Memory Mode, (3) Search Mode, and (4) Acquisition Mode.

The operation in the Track Mode is as described in a general way above, the range gate being maintained in coincidence with the reply pulses. The Search Mode operation will now be described in a general way. Description of operation in the other modes will be given later. The DME goes into the search mode a short time after reply seignals are lost, having first gone into the memory mode upon loss of reply signals. In the search mode, a search rate generator is made to supply pulses to the "increase range" input lead of the ring counter. These pulses cause the stepper motor to be driven at a high speed so that the range gate is driven through the 200 nautical mile range of the DME in about five seconds. As soon as the range gate becomes coincident with reply pulses, the search rate generator is made inactive, and the DME goes out of search, goes into the acquisition mode for a fraction of a second, and then goes into the track mode.

In patent application Ser. No. 311,445 filed Sept. 25, 1963, in the names of Irving A. Sofen and Robert P. Crow, entitled DME With Fast Search, which issued Apr. 12, 1966 as Patent 3,246,325, there is described DME that is provided with extremely fast search, the fast search being obtained by the use of gear shifting and a conventional servo motor. The presently described DME provides substantially the same fast search at a lower cost. In the specific example of the DME being described, as in the above-identified Sofen and Crow application, the search rate is 40 miles per second, and the tracking rate is anywhere from 0 to 2500 miles per hour (i.e. from 0.00 to 0.7 mile per second) depending upon the speed of the aircraft carrying the DME and the relative direction of the ground station. In this example, the DME can search through the entire operating range of 200 miles in five seconds. As a result, the present invention makes it possible for the DME to lock on to a selected ground station very rapidly and give the range to that station.

The invention will be described in detail with reference to the accompanying drawing in which:

FIG. 4 is a schematic and block diagram of certain other units shown in FIG. 1, including the error detector, the ramp generator, the memory control, the search control, the gated pulse counter, and the search rate generator;

FIG. 5 is a schematic diagram of certain other units shown in FIG. 1, including the ring counter, the search amplifier and the stepper motor; and FIG. 6 is a schematic diagram illustrating another embodiment of the invention.

In the several figures like parts are indicated by similar reference characters.

The DME which will now be described is referred to as DMET (Distance Measuring Equipment, TACAN). It has assigned to it 126 transmitting channels and 126 receiving channels which are frequency separated. No specific description of the apparatus providing the separate channels is required because it is known. However, it might be pointed out that a TACAN ground station broadcasts randomly occurring pairs of pulses known in the TACAN art as squitter pulses. One purpose of the squitter pulses, among others, is to provide an A.G.C. signal at the receiver of any interrogating craft which is independent of the number of craft which happen to be interrogating a particular ground station during the same time period.

Figure 1:
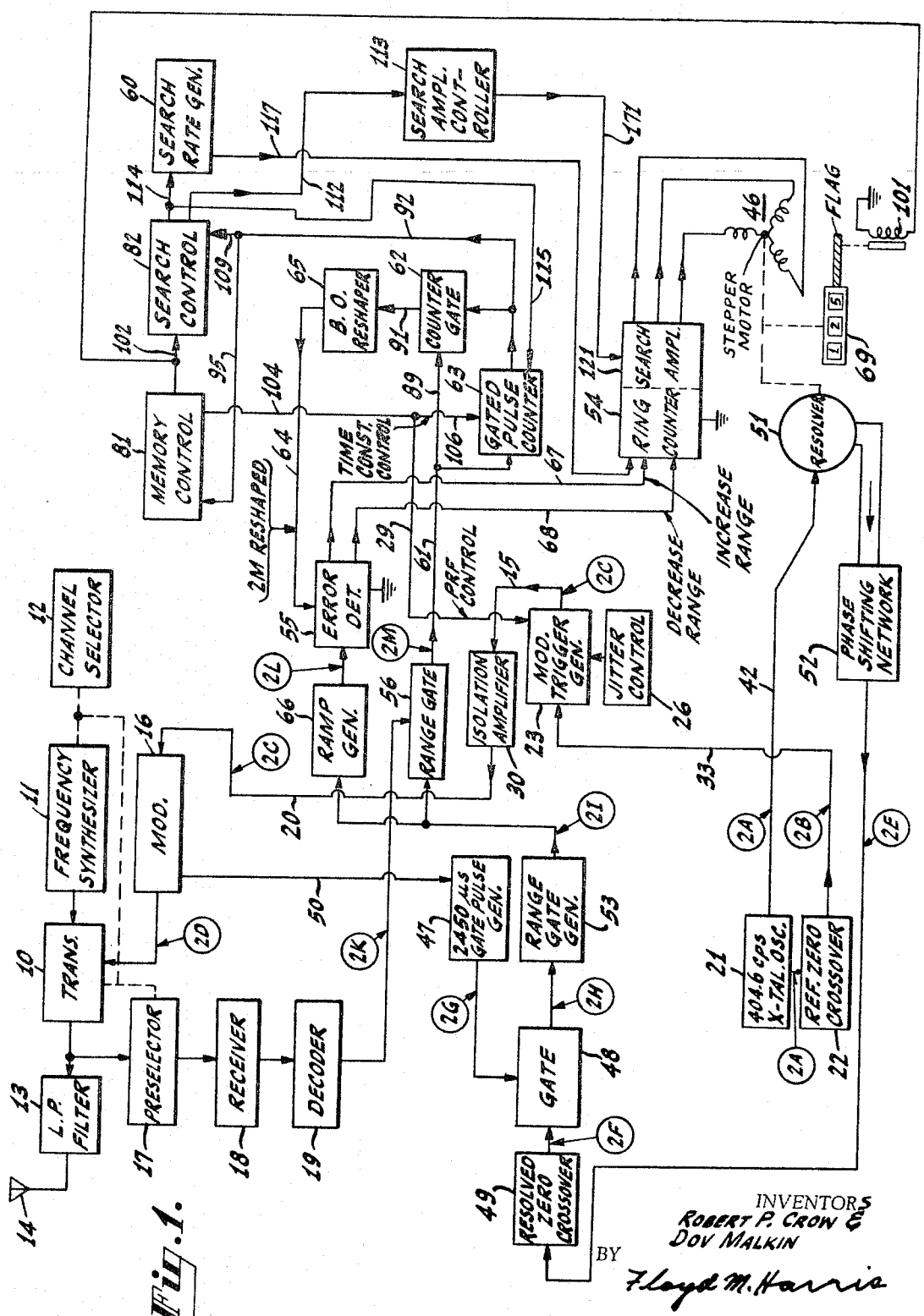
FIG. 1 is a block diagram of one embodiment of the invention.

FIG. 1 is a block diagram of a DME embodying the present invention. The DME comprises a radio transmitter 10 comprising amplifiers to which a selected carrier wave is supplied from a frequency synthesizer 11. The desired carrier wave is selected by a suitable channel selector 12. The transmitter is coupled through a low-pass filter 13 to an antenna 14 which functions as both a transmitting and a receiving antenna. The low-pass filter 13 prevents the transmission of harmonics of the transmitter frequency. It also prevents possible spurious receiver responses at frequencies, for example, where the preselector has additional pass bands. The transmitter is modulated by periodically recurring pairs of code-spaced pulses 2D (FIG. 2D) supplied from a modulator 16 for interrogating the selected ground beacon.

Reply pulses along with squitter pulses from the ground beacon are received by antenna 14 and passed through the filter 13 to a preselector 17 which is tuned to receive reply and squitter pulses on the transmitting channel of the selected ground station. As indicated by the dotted lines, when the transmitter 10 is tuned to interrogate the selected ground station, the preselector is simultaneously tuned to the transmitting frequency of that ground station. The reply signal is passed from preselector 17 to a radio receiver 18. The demodulated signal, shown in FIGURE 2J, appears at the output of receiver 18 as periodically recurring pairs of video reply pulses along with randomly occurring pairs of squitter pulses, there being a pair of reply pulses in response to each pair of interrogating pulses. The video pulses from receiver 18 are applied to a decoder 19 which decodes the pairs of pulses to produce a single pulse 2K (FIG. 2K) for each pair of applied pulses.

RANGE TIMING CIRCUIT

Reference is now made to the range timing circuit which comprises, in this example, a precise oscillator 21 (FIG. 1), such as a crystal controlled oscillator, operating at 404.6 cycles per second, and which supplies a sine wave signal 2A of constant amplitude as shown in FIG. 2A. The oscillator output is supplied to a zero crossover circuit 22 which produces one pulse at the positive going zero crossover for each applied sine wave cycle as shown in FIG. 2B. These are referred to as the reference trigger pulses 2B. The circuit 22 may be any one of several suitable types well known in the art. One such type comprises limiters for squaring the sine wave, a differentiator for producing a pulse of positive polarity at the start (zero crossover) of one half cycle of the square wave, and a blocking oscillator that is triggered by this positive pulse.

The reference trigger pulses 2B are applied to a modulator trigger generator 23 which comprises a blocking oscillator that is triggered by the applied pulses to produce modulator trigger pulses 2C as shown in FIG. 2C. The modulator trigger pulses are passed over leads 15 and 20 to the modulator 16, preferably through an isolation amplifier 30. The modulator 16 includes a coding circuit for producing periodically recurring pairs of pulses, the pairs having the desired code spacing. The modulator 16 also includes a suitable pulse generator to produce the high peak powers required by the transmitter stages.

A jitter control circuit 26 applies a varying voltage to the blocking oscillator (FIG. 3) of generator 23 so that the modulator trigger pulses jitter. This jitter is a discrete amount as will be understood by referring to FIG. 2B and FIG. 2C where the modulator trigger pulse is illustrated for the case where the blocking oscillator has been triggered by the first reference trigger pulses of FIG. 2B, then triggered by the second pulse following the first pulse, next triggered by the fifth pulse following the first pulse. The jitter control may make the blocking oscillator fire on other reference trigger pulses such as the fourth and sixth pulses.

Figure 3:
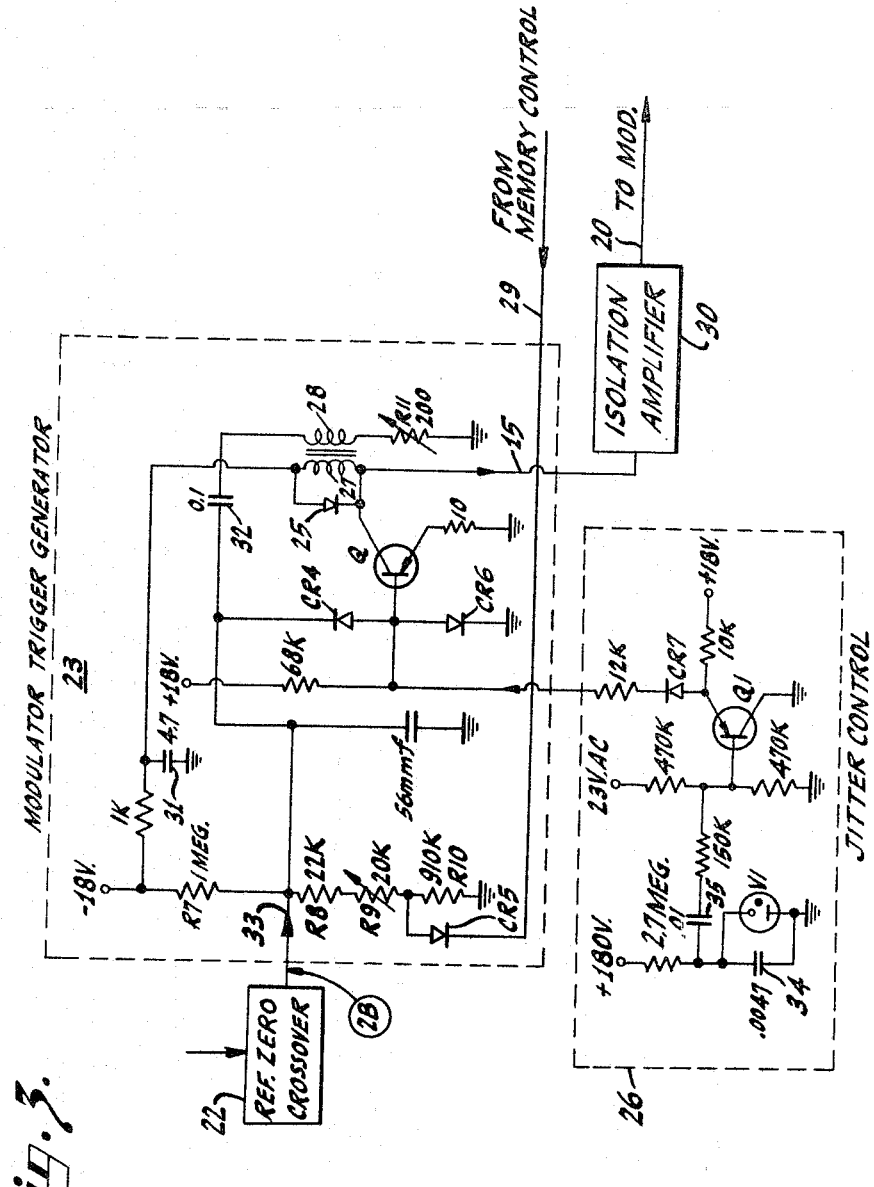
FIG. 3 is a schematic and block diagram of certain units shown in FIG. 1, including the modulator trigger generator.

Now refer to FIG. 3 for circuit details of units 23 and 26 given by way of example. The trigger generator 23 comprises a blocking oscillator which, in the example shown, comprises a transistor Q of the PNP type. The blocking oscillator transformer comprises a primary winding 27 in the collector circuit and a secondary winding 28 in the base circuit. Minus 18 volts is applied to the collector of transistor Q through a 1000 ohm resistor and primary winding 27. A filter capacitor 31 and a protective diode 25 are provided. Secondary winding 28 has one end connected through an adjustable resistor R11 to ground. The other end of secondary 28, which is driven negative when the oscillator fires, is connected through a capacitor 32 and a diode CR4 to the base of transistor Q. The emitter of transistor Q is connected to ground through a ten ohm resistor. When the blocking oscillator fires, current flows from emitter to base, through diode CR4, capacitor 32, and secondary 28 to ground. Thus, at the end of the pulse, capacitor 32 is charged and back biases diode CR4. The negative reference trigger pulses being applied over lead 33 cannot trigger the blocking oscillator until sufficient charge has leaked off capacitor 32 to sufficiently reduce the back-bias on diode CR4.

The leakage path for capacitor 32 is through resistors R7, R8, R9, R10 to ground, and from ground through resistor R11 and secondary 28. The leakage rate, after initial adjustment, is determined by whether resistor R10 is shorted or remains effectively in the circuit. When shorted, the average PRF is 140 pulses per second; when not shorted, the PRF is 27 pulses per second. The PRF is controlled by diode CR5 which is made conducting or non-conducting by the memory control as will be described later.

During the track and memory modes, diode CR5 is held non-conducting (so that R10 is not shorted) by plus 20 volts applied over lead 29 from the memory control. During the search and acquisition modes, diode CR5 conducts and shorts R10 due to lead 29 having been placed substantially at ground potential by the memory control. It should be noted that the top of R8 is held at a positive potential by the charge on capacitor 32 due to pulses from secondary 28 and the resulting current flow through diode CR4. The minus 18 volt supply is not effective to control the potential at the top of R8 because its connection thereto is through a one megohm resistor R7.

It may be noted that the blocking oscillator of trigger generator 23 is not free-running, i.e., it must be triggered since transistor Q is normally biased to cut-off by the voltage drop across a diode CR6 resulting from plus 18 volts connected to its anode through a 68K resistor.

The jitter control circuit 26 is a free-running relaxation oscillator comprising a capacitor 34 connected at one side through a 2.7 megohm resistor to 180 volts D.-C., and connected at the other side to ground. The capacitor is shunted by a neon lamp V1 which breaks down when capacitor 34 charges to a certain voltage. Thus, a sawtooth voltage having an average frequency of about 600 c.p.s. appears across capacitor 34. This sawtooth voltage is coupled by way of an emitter-follower transistor Q1 of the PNP type to the discharge path of blocking oscillator capacitor 32, thus superimposing a wave in the PRF control RC network that jitters the PRF output of the modulation trigger generator by a few counts. The jitter is a discrete amount as previously described.

The sawtooth voltage is applied to the blocking oscillator by way of Q1 as follows. The high voltage side of capacitor 34 is coupled through a capacitor 35 and a 150K resistor to the base of transistor Q1. The base of Q1 is also connected through a 470K resistor to ground, and through a second 470K resistor to a 23 volt A.C. source which produces additional random jitter.

The collector of Q1 is connected directly to ground. The emitter is connected through a 10K resistor to plus 18 volts. The coupling from Q1 to the blocking oscillator is from the emitter through a diode CR7 and a 12K resistor to the base of transistor Q.

The modulator trigger pulses produced by trigger generator 23 are applied from the collector of transistor Q through leads 15 and 20 to the modulator 16, preferably through the isolation amplifier 30 which may be of the emitter-follower type.

TRACK AND SEARCH CIRCUITRY

Reference is now made more particularly to the automatic track-in-range and automatic search-in-range circuitry.

The resolved trigger pulses 2F (FIG. 2F), which control the timing of the range gate, are obtained as follows. The sine wave signal from timing oscillator 21 is supplied over a lead 42 to the rotor of a resolver 51 which is driven by the stepper range motor 46 through suitable gearing, not shown. The motor makes 15 degree steps, or 24 steps per revolution. It is geared down 400 to 1 to the resolver so that the resolver makes one revolution for 200 miles. Thus, 9600 steps of approximately 0.021 mile each are required for 200 miles. Two out-of-phase output signals are obtained from the resolver stator windings. These output signals are supplied to a phase shifting network 52 in which they are added to produce a single phase-shifted sine wave signal, shown in FIG. 2E, which is phase shifted by an amount that is a function of the position of the resolver rotor. This signal is referred to as the resolved timing signal 2E.

The timing signal 2E is fed to the zero crossover circuit 49 which may be the same as the zero crossover circuit 22. Thus, the output of unit 49 is the resolved trigger pulses 2F (FIG. 2F).

It is necessary to eliminate all resolved trigger pulses except the first one to follow an interrogation. Therefore, they are supplied to a coincidence circuit or gate 48 to which is also supplied a gate pulse, having a width of 2450 microseconds in the present example, from a gate pulse generator 47. This gate pulse is shown in FIG. 2G and is identified as pulse 2G. The resolved trigger pulse of the pulses 2F that is coincident with the gate pulse 2G is passed by the gate 48. This is the gated resolved pulse 2H shown in FIG. 2H. The gate 48 may be a coincidence circuit of any suitable type, such as a coincidence diode circuit. The gate pulse generator 47 may be, for example, a monostable multivibrator which is triggered on through a lead 50 by the leading edge of the first of the pair of interrogation pulses 2D, and which turns itself off at the end of 2450µ's. Or, such a multivibrator may be triggered on by the modulator trigger pulses 2C. It is evident that the pulse repetition frequency (PRF) of the output pulses 2H of gate 48 is the same as that of the modulator trigger pulses 2C.

For producing the range gate pulses 2I (FIG. 2I), the gated resolved pulses 2H are applied to a range gate generator 53 which may be a monostable multivibrator that is triggered by the applied pulses to produce a range gate pulse 2I. In the present example, the range gate pulse is 32 microseconds wide. It will now be evident that the time of occurence of the range gate pulse 2I with respect to the modulator trigger pulse 2C is a function of the position of the resolver 51 as set by the range stepper motor 46.

The range stepper motor 46 is driven by pulses from a ring counter 54 which is under the control of pulses from an error detector 55 when the DME is in the acquisition and automatic track-in-range modes, and which is under the control of pulses from a search rate generator 60 when the DME is in automatic search.

Figure 2:
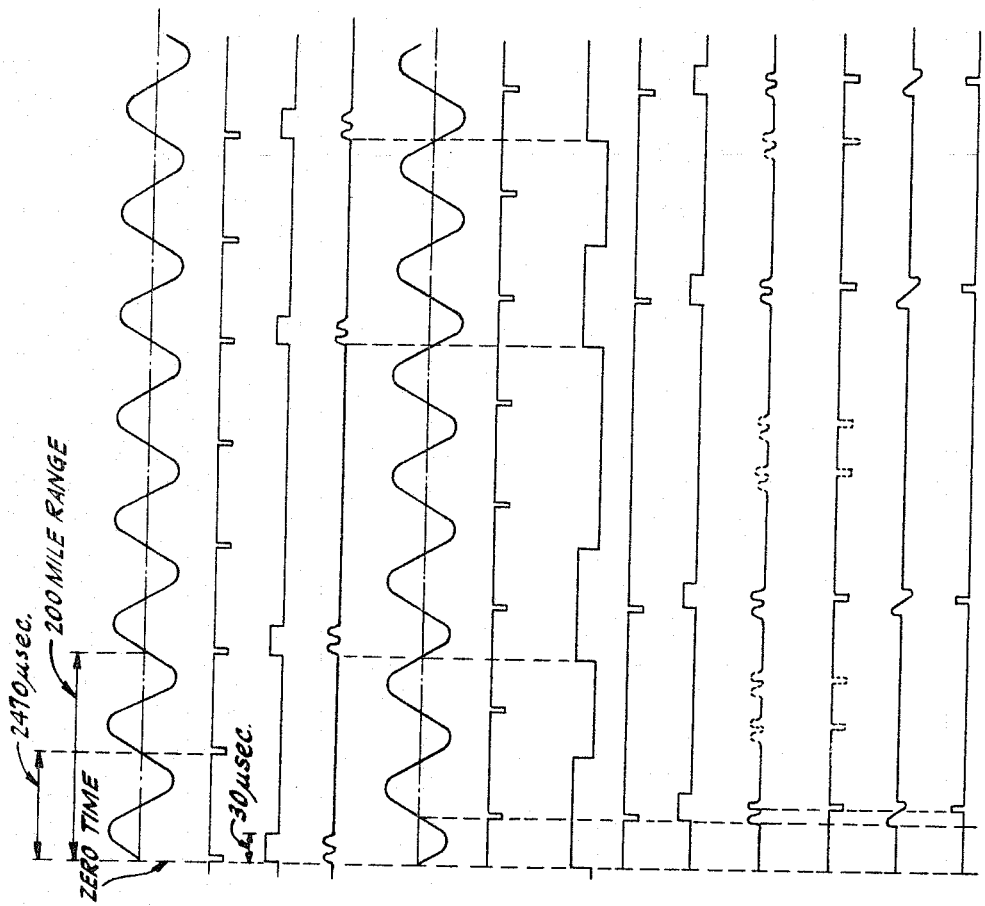
FIG. 2 is a range timing diagram for the apparatus of FIG. 1.

The controlling pulses from the error detector 55 are obtained as follows. The range gate pulses 2I are applied to a range gate or coincidence circuit 56 which may be of the type comprising diodes. Also, the decoded reply pulses 2K (FIG. 2K) are supplied from the decoder 19 to the range gate 56. When a decoded pulse 2K is in time coincidence with the range gate pulse 2I as illustrated in FIG. 2, the decoded reply pulse passes through the range gate 56 and is applied over a lead 61 to a counter gate 62 and also to a range gated pulse counter 63. The range gated reply pulses on lead 61 are identified as pulses 2M (FIG. 2M). As described hereinafter, if enough successive reply pulses are coincident with the range gate pulse, the voltage applied to the counter gate 62 by the gated pulse counter 63 will make the counter gate 62 pass the gated reply pulses 2M (FIG. 2M) and apply them to a blocking oscillator 65 which reshapes them. The reshaped pulses 2M are supplied over a lead 64 to the error detector 55.

Ramp pulses 2L (FIG. 2L) are also applied to the error detector 55 from a ramp generator 66. The ramp pulses are produced in a known manner by the ramp generator upon the application thereto of the range gate pulses 2I. One example of such a ramp generator is described in the above-identified Sofen and Crow application. Another example of a ramp generator is illustrated in FIG. 4 and will be described hereinafter.

If the ramp pulse 2L is centered with respect to the gated reply pulse 2M, no pulses will appear on the error detector output leads 67 and 68, and the ring counter 54 and stepper motor 46 will not be driven (unless in the search mode as described hereinafter). If the gated reply pulses advance in time to where the ramp 2L is positive, the gated reply pulses appear on lead 68 and drive the stepper motor 46, by way of the ring counter 54, in the direction to move the range gate and the ramp in the decrease-range direction to center the ramp with respect to the reply pulse.

On the other hand, if the gated reply pulses retard in time to where the ramp 2L is negative, the gated reply pulses appear on lead 67 and drive the stepper motor 46, by way of ring counter 54, in the direction to move the range gate and the ramp in the increase-range direction to center the ramp with respect to the reply pulse. In the track mode, the stepper motor is always driven in direction to center the ramp pulse with respect to the gated reply pulse. Thus, the range gate is held in time coincidence with the reply pulses so that range is shown by a range indicator, such as a digital indicator 69 or a range dial and pointer, that is coupled to the stepper motor through suitable gearing, not shown. In the present example, the motor is geared down 20 to 1 to the digital indicator shaft.

The circuit of the error detector 55 and of a suitable ramp generator and their operation will now be described with reference to FIG. 4. The ramp generator comprises a transistor Q25 of the NPN type which has in its emitter circuit a series resonant circuit consisting of a capacitor C and an inductance coil L. The resonant circuit is shunted by a resistor R15. Q25 is normally cut off by the forward voltage drop across a diode CR15. When the positive range gate pulse 2I occurs, it is coupled through a 1.0 mf. capacitor to the base of Q25, and Q25 conducts, passing a current through the circuit C, L. The voltage across L rises rapidly to a maximum of about plus 15 volts and then falls in a damped cosine wave during the range gate pulse. At the end of the range gate pulse, the voltage reaches its negative peak of about minus 10 volts. Q25 then cuts off and the energy in the resonant circuit is rapidly dissipated in resistor R15. The output of the ramp generator, therefore, is the ramp pulse 2L (FIG. 2L) which resembles one-half cycle of a cosine wave. The ramp pulse is applied over a lead 175 to the error detector 55.

The ramp pulse 2L is applied from the lead 175 through a 100 ohm resistor to the base of a transistor Q2 of the NPN type. The reshaped reply pulses 2M are applied through a capacitor 71 and through a 2.7K resistor to the collector of a transistor Q3 of the NPN type, and through another 2.7K resistor to the collector of a transistor Q4 of the NPN type. The ends of the 2.7K resistors remote from the collectors are connected through a 5.6K resistor to ground.

The collector of Q3 is connected through a diode 72 to an ouput lead 67 on which increase-range pulses will appear. The collector of Q4 is connected to an output lead 68 on which decrease-range pulses will appear.

Transistor Q2 functions as an emitter-follower. The emiter of Q2 is connected through an 820 ohm resistor and a diode 76 to the base of Q3, the anode of the diode being connected to said base. The base of Q3 is connected through a 22K resistor to plus 23 volts so that Q3 is forward biased if the emitter of Q2 is at zero potential. The emitter of Q3 is grounded.

The base of Q4 is grounded. The emitter of Q4 is connected through a diode 77 and a 2.7K resistor to minus 22 volts so that Q4 is forward biased if the emitter of Q2 is at zero potential. The emitter of Q2 is connected through an 82 ohm resistor and a diode 78 to the junction point of the diode 77 and the 2.7K resistor, the cathode of diode 78 being connected to the cathode of diode 77.

The operation of the error detector 55 is as follows. At the instant the ramp pulse is at zero potential the emitter of Q2 is at zero potential. At this time Q3 and Q4 are both forward biased so that their collectors present a low impedance to a reply pulse 2M if it is applied to the collectors at this time whereby said pulses are shorted to ground. Therefore, they cannot appear on either one of the output leads 67 and 68.

If the reply pulses 2M advance in time to where the ramp signal and the emitter of Q2 are positive, the forward bias on Q4 is overcome (diode 78 now conducting), and Q4 is back-biased. At the same time diode 76 is back-biased, preventing the emitter-base junction of Q3 from loading Q2, but Q3 remains forward-biased by the current through the 22K resistor. The reply pulses 2M appearing at this time see a high impedance at the collector of Q4 and appear on the output lead 68 as decrease-range pulses.

If the reply pulses 2M retard in time to where the ramp signal and the emitter of Q2 are negative, the opposite condition exists. Now the emitter base junction of Q3 is back-biased while that of Q4 remains forward-biased. The reply pulses 2M appearing at this time see a high impedance at the collector of Q3 and appear on the output lead 67 as increase-range pulses.

The purpose of diodes 76 and 78 is to provide isolation and prevent loading of the ramp voltage by the error detector, and to produce a narrow "dead zone" around the zero ramp voltage where reply pulses 2M are passed to neither one of the output leads 67 and 68. This prevents the range servo from hunting continuously when the range is not changing. It also reduces servo jitter when the range is changing. The two diodes accomplish this by requiring ramp voltages offset from zero for operation of their respective range error functions. For example, because of the forward voltage drop of diode 76 the ramp voltage at the output of Q2 must move approximately 0.6 volt more negative before Q3 is cut off and a reply pulse will produce an increase-range output. The purpose of diode 77 is to protect the emitter-base junction of Q4 from excessive reverse voltage from the ramp signal.

MODE SWITCHING

The switching of the DME from one mode of operation to another is under the control of the gated pulse counter 63, a memory control 81, and a search control 82, these units being shown in block in FIG. 1 and in circuit detail in FIG. 4. As previously stated, there are four modes of operation, namely, (1) automatic track, (2) proportional memory, (3) automatic search, and (4) acquisition.

The circuits for switching the DME into these different modes of operation will now be described, particularly with reference to FIG. 4. In FIG. 4 and also in FIGS. 3 and 5, some of the circuit values are given merely by way of example. Unless otherwise indicated, the values are in ohms, thousands of ohms (k), megohms (MEG), microfarads and micro-microfarads (mmf.).

The gated pulse counter 63 includes a conventional monostable multivibrator comprising transistors Q5 and Q6 of the PNP type. Other multivibrator circuits than the specific one illustrated may be employed. Whenever it is triggered by a reply pulse 2M from the range gate 56 (or by a squitter pulse), it produces a 3.5 millisecond pulse of positive polarity of approximately 18 volts and of constant amplitude at the collector of Q6.

Since only the reply pulses 2M are synchronous with the interrogations, they alone pass through the range gate 56 in any appreciable number. By determining when the rate at which reply pulses pass through the range gate 56 reaches the expected value, the reply pulse can be detected. In the present example, if three of four consecutive pulses at the search PRF pass through the range gate 56, the DME will be switched out of the search mode as described hereinafter by the resulting three or four consecutive 3.5 millisecond pulses at the collector of Q6.

Continuing the circuit description of the gated pulse counter, each 3.5 millisecond pulse charges a capacitor 83 through a diode 84 and a resistor 86. The left hand side of capacitor 83 is connected to plus 18 volts. It is also connected through an 82K resistor to the junction point of diode 84 and resistor 96. The right hand side of capacitor 83 is connected through a 39K resistor to minus 18 volts. It is also connected through a diode 85 (when it is conducting) and through a 6.8K resistor to minus 18 volts and through a 3.3K resistor and a lead 106 to the memory control 81 as described hereinafter. This "charging" of capacitor 83 is charging in the sense that it is making the right hand side of capacitor 83 less negative or more positive; it actually reduces the voltage across the capacitor. Similarly, "discharging" of capacitor 83 is discharging in the sense that it is making the right said side of capacitor 83 more negative; it actually increases the voltage across the capacitor. The right hand side of capacitor 83 is connected through a diode 87 to the base of a transistor Q7 of the PNP type. Q7 is normally conducting, that is, it is conducting when no pulses, or an insufficient number of pulses, are being applied to the gated pulse counter from the range gate 56. At that time the right hand side of capacitor 83 is negative, and diode 87 is non-conducting Three or four successive pulses from the range gate 56 and the resulting positive 18 volt 3.5 millisecond pulses cause a "charge" of capacitor 83 and bring the right hand side of capacitor 83 to a positive potential whereby diode 87 conducts and transistor Q7 is cut off.

When Q7 is cut off, its collector is at approximately minus 20 volts. This voltage is applied through a 27K resistor to the cathode of a counter-gate diode 88. Since the anode of diode 88 is connected through a 68K resistor to minus 18 volts, the diode 88 conducts so that the reply pulses 2M from the lead 89 pass through the diode to the lead 91 and on to the blocking oscillator reshaper 65.

The voltage on the collector of Q7 is also applied by way of a lead 92 to both the memory control 81 and the search control 82.

Refer now to the memory control 81. It comprises a memory capacitor 93 which has one side grounded and which has the other connected by way of a 100K resistor, a lead 95, and the lead 92 to the collector of Q7 in the gated pulse counter. If no reply pulses 2M are passing through the range gate (as in search), Q7 is conducting, its collector is at approximately ground potential, and memory capacitor 93 is in its "uncharged" condition. In this "uncharged" condition the ungrounded side of capacitor 93 is very slightly positive, this slight positive charge being limited by a diode 94 and also by the emitter-base junction of a transistor Q8.

The upper side of capacitor 93 is coupled through a diode 96 to the base of Q8 which is of the NPN type. The collector of Q8 is coupled through a 2.2K resistor to the base of a transistor Q9 of the PNP type. The collector of Q9 is connected through a 4.7K resistor to ground, and is coupled to the base of a transistor Q10 of the PNP type. Plus 23 volts is applied to a 22K resistor to the collector of Q8, through a diode 97 to the emitter of Q9, and through diodes 98 and 99 in series to the emitter of Q10 for proper biasing.

The collector of Q10 is connected through a flag alarm solenoid 101 to ground. It is also connected by a lead 102 to the search control 82.

Assume that there are no gated reply pulses 2M (as in search) so that Q7 is conducting and memory capacitor 93 is discharged. Then Q8 is biased into conduction by current through resistor 103. In this condition Q9 is also turned on and Q10 is cut off. Then the potential at the collector of Q10 is near zero, the flag alarm solenoid 101 is de-energized, and the flag covers the range indicator numerals.

Also, the modulator trigger generator 23 operates at the high PRF of 140 pulses per second because the collector of Q10 (at near zero potential) is connected by a lead 104 and the lead 29 to the cathode of CR5 (FIG. 3) making it conduct and short resistor R10.

Also, in the gated pulse counter the discharge circuit for capacitor 83 has the shorter time constant. The time constant is controlled by the connection of the collector of Q10 over the lead 104 and a lead 106 to the 3.3K resistor. Since the collector of Q10 is near zero potential in the case assumed, diode 85 is not back-biased and is conducting to include the 6.8K and 3.3K resistors in the discharge circuit.

When three or four successive reply pulses 2M pass through the range gate and are applied to the gated pulse counter, Q7 cuts off and its collector goes to about minus 20 volts. Memory capacitor 93 now begins to charge by way of the leads 92 and 95 and the 100K resistor. In about 0.40 second the capacitor 93 has charged negatively enough to cut off Q8, cutting off Q9, and turning on Q10. The collector of Q10 is now at approximately plus 18 volts.

This 0.40 second period before Q8 is cut off is the acquisition period during which the PRF is still at the high rate of 140 pulses per second, and the time constant of the discharge circuit for counter capacitor 83 still is short. Reply pulses from the error detector 55 are driving the stepper motor by way of the ring counter.

The memory capacitor 93 continues to charge so long as Q7 remains cut off until it reaches its maximum charge in about ten seconds.

The search control 82 comprises a transistor Q11 of the PNP type and a transistor Q12 of the NPN type. The collector of memory control transistor Q10 is connected through the lead 102, a diode 107, and a 12K resistor to the base of Q11. A minus 18 volt source is connected through an 82K resistor to the base of Q11. A minus 22 volt source is connected to the collector of Q11 through an 18K resistor. The emitter of Q11 is connected to the cathode of a diode 108, and through this diode and a lead 109 and the lead 92 to the collector of Q7 in the counter.

Q12 has its base connected to the collector of Q11. Its emitter is connected through a 1.2K resistor and a diode 111 to minus 22 volts. Its collector is connected through a 470 ohm resistor to plus 18 volts. A lead 112 from the emitter goes to a search amplifier controller 113 (FIGS. 1 and 5) as described hereinafter. A lead 114 goes to the search rate generator 60, this lead going to the anode of a diode 116, and through the diode to the base of a transistor Q13 of the PNP type forming part of a blocking oscillator. There is also a feedback connection from the collector of Q12 by way of lead 114 and a lead 115 and through the two 6.8 mf. capacitors to the base of Q7 so that the positive pulse formed as Q12 cuts off is coupled to the base of Q7 as a positive feedback to speed up the transistion process.

The operation of the search control will now be described. Assume that an insufficient number of successive range-gated reply pulses 2M are being applied to the gated pulse counter (as in search) so that Q7 is conducting and its collector is at approximately ground potential. Now Q10 in memory control 81 is nonconducting, its collector is at ground potential, so that Q11 is conducting since it is forward-biased by the minus 18 volt source, and since the diode 108 in the emitter circuit is conducting. Q12 now also is conducting, and its emitter and collector are both at approximately minus 5 volts. With the collector at minus 5 volts, the diode 116 in the search rate generator 60 is back-biased so that the search rate generator is allowed to oscillate. Its output is supplied over a lead 117 to the ring counter for driving the stepper motor 46 at a high speed for fast search as described hereinafter.

Next assume that three or four reply pulses pass through the range gate to cut off Q7 in the gated pulse counter putting its collector at minus 20 volts. This immediately, by way of leads 92 and 109, back-biases diode 108 in the search control so that Q11 and Q12 cut off. The collector of Q12 goes positive, the diode 116 is forward-biased, the base of Q13 swings positive, cutting it off, and the search rate generator 60 stops oscillating. Thus, during the acquisition period of 0.40 second following cut off of Q7, the only pulses supplied to the ring counter are those from the error detector. Since during this acquisition period memory capacitor 93 has not charged enough to cut off Q8, Q10 is still off with its collector at ground, the PRF remains high as in search, and the time constant of the discharge path for counter capacitor 83 remains short.

As soon as the charge on memory capacitor 93 reaches a value to cut off Q8, Q10 is made conducting, and its collector goes to plus 18 volts so that diode CR5 in the modulator trigger generator is back-biased by way of leads 104 and 29 to reduce the PRF to 27 pulses per second. This plus 18 volts by way of leads 104 and 106 also back-biases diode 85 in the counter so that the time constant of the counter capacitor discharge path is made longer to conform with the lower PRF. The DME is now in the track mode.

The memory control prevents the DME from going into search immediately upon loss of reply pulses. When reply signals are lost, Q7 of the gated pulse counter become conducting and its collector goes to ground potential. Memory capacitor 93 now begins to discharge through the 100K resistor, the leads 95 and 92, and through Q7 to ground. There is also a discharge through diode 96 and resistor 103 through the plus 18 volt source. The latter discharge may also be viewed as charging of capacitor 93 in the positive direction. Until capacitor 93 discharges sufficiently to turn on Q8 of the memory control, and thus turn on Q12 of the search control thereby turning on the search rate generator, the memory control holds the DME in the track condition with the search rate generator held non-oscillating.

Since there are no reply pulses, the ring counter and the stepper motor 46 are no longer driven, and the range gate pulse holds in its last position, this being position memory. With a memory of about 10 seconds, and at maximum aircraft speed, the range gate is not moved enough so that reply pulses fail to be coincident with the range gate pulse if they return in 10 seconds or so.

Memory is a maximum of about 10 seconds. It is less if the DME is in track less than ten seconds, in which case the memory capacitor 93 receives less charge, and therefore is discharged to the search initiating level quicker. This is proportional memory, the length of time the DME is held in the memory mode being proportional to the time the DME is in the track mode, up to about 10 seconds when maximum memory is provided.

RANGE-SERVO SYSTEM

The range-servo system drives the stepper range motor 46 which turns the phase-shifting resolver 51 and the range indicator 69 (FIGS. 1 and 5). This system includes the ring counter 54 which is a three-stage counter that generates a three-phase square-wave signal to drive the three-phase stepper motor 46. The ring counter is designed to run in either direction and drive the motor 46 in either direction depending upon whether trigger pulses are applied to the decrease-range lead 68 or to the increase-range lead 67. Thus, when tracking, the reply pulses from the error detector 55 increase or decrease range to hold the DME in automatic range track. In the present example the motor 46 is a variable reluctance three-phase motor Model 011-006-3 manufactured by IMC Magnetic Corporation. It should be understood that the invention is not limited to the use of this particular type of stepper motor. There are other suitable stepper motors that may be employed.

In the search mode, the search-rate generator 60 (FIG. 4) supplies pulses to the ring counter 54 by way of lead 117 and a capacitor 124 (FIG. 5) to the increase-range input terminal to drive the stepper motor 46 at high speed for fast search. In search, resolver 51 is driven continuously in the direction to move the range gate 21 in the increase-range direction, i.e., its time of occurrence with respect to the transmitter interrogation increases. After the range gate 21 has swept through to the end of the 200 nautical mile range, it again proceeds to sweep through the 200 mile range in the increasing direction. In the example illustrated in FIG. 5, the ring counter signal is amplified during search by a search amplifier 121 to supply added power to the stepper motor during search.

As will be discussed later in connection with FIG. 6, the search amplifier 121 may be omitted, and the ring counter output supplied directly to the stepper motor. The use of the search amplifier 121 makes it possible to design the ring counter with less power handling capability.

The use of the search amplifier as described herein and its use with a ring counter as described herein are described and claimed in application Ser. No. 480,357 filed on the same day as the present application in the names of Robert P. Crow and Michel Masse, and entitled, Controller for Step Servo Motor.

Referring now in more detail to the search-rate generator 60 (FIG. 4), it is a blocking oscillator that is designed to start oscillating at from 250 to 450 pulses per second when diode 116 is back-biased and to rapidly increase in frequency to about 2200 pulses per second. This increase in pulse rate is obtained as follows. Initially the forward base-emitter bias of Q13 is high, and the resulting high-amplitude blocking oscillations require a relatively long time to recover, resulting in the lower frequency pulses. After each blocking oscillation, some charge is left on capacitor 122. This charge builds up exponentially. As it builds up, the oscillation amplitude decreases somewhat, and the oscillator frequency increases to its maximum of about 2200 pulses per second. It takes about 100 milliseconds for the oscillator to reach this maximum rate. The maximum rate may be set by adjusting the value of resistor 123.

The frequency of the search-rate generator 60 is made to increase in this way because the stepper motor 46 would not start if the high frequency pulses were applied to it when it was stationary. However, it will be started by the lower frequency pulse rate and will pick up speed as the pulses increase in frequency until the motor is "slewing," i.e., acting like a synchronous motor rather than stepping.

The ring counter, shown in FIG. 5, comprises transistors Q14, Q15, and Q16, each of the NPN type. The emitters of these transistors are grounded. The collector of Q14 is connected to plus 23 volts through a lead 126, a 75 ohm resistor, a diode 127, a lead 128, winding 129 of stepper motor 46, and a 4 ohm resistor to the positive 23 volt terminal. The collector of Q15 is similarly connected to plus 23 volts, this connection being through lead 131, a diode 132, lead 133, and through winding 134 of the stepper motor. The collector of Q16 is similarly connected to plus 23 volts, this connection being through lead 136, a diode 137, lead 138, and through winding 139 of the stepper motor.

The base of Q14 is connected to the anode of a zener diode Z1, and through Z1, a lead 141 and a 1.2K resistor to plus 23 volts. The bases of Q15 and Q16 are similarly connected through zener diodes Z2 and Z3, respectively, and leads 142 and 143, respectively, to plus 23 volts. If there is current flow through a zener diode, its associated transistor will be conducting because zener diode current also flows from the base to the emitter of the transistor.

Th lead 141 from Z1 is connected through a diode 144 to the collector of Q15 by way of lead 131; it is also connected through a diode 146 to the collector of Q16 by way of lead 136. Thus, if Q15 and Q16 are cut off, their collectors are at plus 23 volts and back-bias diodes 144 and 146 whereby the voltage on lead 141 is not pulled down by these diodes. As a result, Z1 conducts and holds Q14 turned on.

The lead 142 from Z2 is connected through a diode 147 to the collector of Q16 by way of lead 136; it is also connected through a diode 148 to the collector of Q14 by way of lead 126.

The lead 143 from Z3 is connected through a diode 149 to the collector of Q14 by way of lead 126; it is also connected through a diode 151 to the collector of Q15 by way of lead 131.

The decrease-range reply pulses from error detector 55 are applied from the lead 68 through a 0.015 microfarad capacitor to a bus 152. From bus 152 these pulses are applied through a diode 153 and a capacitor 154 to the base of Q14, through a diode 156 and a capacitor 157 to the base of Q15, and through a diode 158 and a capacitor 159 to the base of Q16.

The increase-range reply pulses from error detector 55 are applied from the lead 67 to a bus 161. From bus 161 these pulses are applied through a diode 162 and a capacitor 163 to the base of Q14, through a diode 164 and a capacitor 166 to the base of Q15, and through a diode 167 and a capacitor 168 to the base of Q16.

The diode side of capacitor 163 (at the input of Q14) connects through a 10K resistor to the collector of Q15, the diode side of capacitor 154 connects through a 10K resistor to the collector of Q16. The diode side of capacitor 166 (at the input of Q15) connects through a 10K resistor to the collector of Q16, the diode side of capacitor 157 connects through a 10K resistor to the collector of Q14. The diode side of capacitor 168 (at the input of Q16) connects through a 10K resistor to the collector of Q14, the diode side of capacitor 159 connects through a 10K resistor to the collector of Q15.

The operation of the ring counter will now be described. In the normal condition with no input pulses applied, one of the transistors is on and the other two are off. Assume Q15 is on, i.e., conducting. It is conducting because of current flow through zener diode Z2 and through the base to emitter of Q15. Z2 is conducting because the lead 142 is at a positive voltage since the diodes 147 and 148 are cut off so that they cannot pull down the voltage on lead 142. Diodes 147 and 148 are cut off since Q14 and Q16 are cut off so that their collector leads 126 and 136, respectively, are at approximately plus 23 volts supplied through the windings of stepper motor 46.

Q14 and Q16 are held cut off because their zener diodes Z1 and Z3, respectively, are nonconducting so that there is no base to emitter current flow in Q14 and Q16. Z1 and Z3 are nonconducting because the diodes 144 and 151, respectively, are conducting and clamp leads 141 and 143, respectively, to the potential of the Q15 collector which is substantially ground potential since Q15 is conducting.

With Q15 conducting, the collectors of nonconducting transistors Q14 and Q16 are at plus 23 volts. Thus, the input capacitors 157 and 166 of Q15 are each charged by the collector voltage through a 10K resistor. Since the diode side of these capacitors is charged positive, the diodes 156 and 164 are back-biased so that input pulses cannot pass through them. Similarly, one of the input capacitors of Q14, the capacitor 154, is charged by way of its 10K resistor connection to the collector of Q16 so that diode 153 is back-biased. The input capacitor 163 is not charged because its 10K resistor connection is to the Q15 collector which is at substantially ground since Q15 is conducting. Similarly, one of the input capacitors of Q16, the capacitor 168, is charged by way of its 10K resistor connection to the collector of Q14 so that diode 167 is back-biased. The input capacitor 159 is not charged because its 10K resistor connection is to the Q15 collector which is at substantially ground potential.

From the foregoing it will be seen that only diode 162 at the input of Q14 is set up to pass increase-range pulses, and only diode 158 at the input of Q16 is set up to pass decrease-range pulses. All other input diodes are back-biased. A certain set-up time is required to back-bias these other diodes, the set-up time in the present example being about 0.2 millisecond. The set-up time is determined by the time constant of the charging circuit for the 0.015 microfarad input capacitor, the charging circuit being through a 10K resistor and a 3.9K resistor.

It will be apparent that if increase-range reply pulses are supplied over lead 67 from the error detector, they will pass through diode 162 and trigger Q14 on, the next increase-range pulse will trigger Q16 on, etc., the sequence being Q15, Q14, Q16. On the other hand, assume that the applied pulses were decrease-range pulses from the lead 68. They pass through the diode 158 and trigger Q16 on, the next decrease-range pulse will trigger Q14 on, etc., the sequence being Q15, Q16, Q14.

In prior DME's a range error detector is employed in which its output is smoothed with a relatively long time constant RC integration network. Such an error detector is disclosed in the above-identified Sofen and Crow application. Acceleration and velocity errors result from this type of error detector. A DME using this type of error detector also is subject to errors resulting from large error random 12 microsecond early replies, which are common with present TACAN ground stations.

These errors are avoided or reduced in the DME here described. With the stepper motor servo system in track (or acquisition), the range gated reply pulses directly step the motor in one direction or the other, depending on their position with respect to the center of the ramp signal. A gated reply pulse arriving early (on the left, or positive side of the ramp) will cause the error detector 55 to produce a pulse on the decrease-range lead 68. This in turn causes the motor 46 to step, and the range indicator 69 to turn approximately 0.02 mile toward the ground station. A late reply pulse causes the opposite effect, producing a pulse on the increase-range lead 67. A dead zone equivalent to one or two steps exists in the center of the ramp.

Therefore, reply pulses arriving more than the equivalent of 0.02 mile from the ramp center will cause the servo motor to take but one step per pulse, regardless of how large the error may be for any given reply. Thus, random large error replies will have a minimum effect on the accuracy; and within the maximum tracking velocity limits, the servo system and range indicator will have no more than a one step error, aside from any jitter effects in the replies. Also, since there is no integration of the error detector output, the acceleration and velocity errors introduced in prior DMEs by their error detector integration are avoided.

Since during the automatic range track mode the reply pulses are recurring at a fixed frequency, at 27 pulses per second in the present example, and since one pulse causes the stepper motor to make one step, the question may arise as to how the stepper motor slows down, for example, when the aircraft carrying the DME slows down, so that the range gate pulse is held coincident with the reply pulses. The main answer to this is that when the range gate pulse and the ramp signal are driven too far in one direction, the stepper motor reverses. More specifically, the motor jitters, stepping first in one direction and then in the other to hold the range gate pulse and the ramp signal substantially centered with respect to the reply pulses.

Furthermore, the dead zone in the error detector reduces the amount of this motor jitter. Assume an instant when the ramp signal is centered with respect to the reply pulses so that, at the error detector, the reply pulses are in the dead zone so that no pulses are applied to the stepper motor. As the aircraft moves toward or away from the ground station being interrogated, the reply pulses move out or partly out of the dead zone so that the motor is stepped in the direction to pull the reply pulses back into the dead zone momentarily. At the slower aircraft speeds, some of the reply pulses remain in the dead zone so that they are not active to step the motor whereby the above-mentioned motor jitter is reduced.

It may be noted that in the present example, with the aircraft traveling at 600 knots toward or away from the ground station, the DME will be held in automatic track-in-range by driving the motor at eight steps per second. Thus, eight of the 27 reply pulses (occurring in one second) shifting out of the dead zone will cause the motor to make eight steps per second and hold the DME in track.

In the search mode it is the pulses over lead 117 that are applied to the ring counter. They are applied to the increase-range bus 161 and drive the ring counter in the sequence Q15, Q14, Q16 as previously described.

As the ring counter is driven during the track mode, in the increase-range sequence Q15, Q14, Q16 for example, current flows successively through the windings of the stepper motor 46. For example, when Q15 is on, current flows from plus 23 volts through winding 134, through lead 133, diode 132, the 75 ohm resistor, and through transistor Q15 to ground and to the ground terminal of the 23 volt source. The 75 ohm resistor reduces the current and motor dissipation in the track mode where full motor torque is not required for the low stepping rates. When Q14 is on, current flows through winding 129 and through a similar path to Q14, and through Q14 to ground. When Q16 is on, current flows through winding 139 and through a similar path to Q16 and through Q16 to ground.

The search amplifier 121 comes into operation when reply pulses have been lost and the DME has gone into the search mode. This amplifier comprises a Darlington pair of transistors Q17 and Q18 of the NPN type, a second similar Darlington pair Q19, Q20, and a third similar Darlington pair Q21, Q22.

The collectors of Q17, Q18 connect through lead 128 to motor winding 129, the collectors of Q19, Q20 connect through lead 133 to the motor winding 134, and the collectors of Q21, Q22 connect through lead 138 to motor winding 139.

The transistors Q17 and Q18 are protected against positive voltage overshoot transients from the motor winding 129 by a diode CR10 connected between the collectors and plus 23 volts. Likewise, transistors Q19 and Q20 are protected by a diode CR11, and transistors Q21 and Q22 are protected by a diode CR12. Since each of the diodes CR10, CR11 and CR12 is connected across a motor winding, these diodes also damp the stepper motor.

The emitters of Q18, Q20, and Q22 connect to a lead 171 going to the collector of a transistor Q23 of the NPN type which comprises the search amplifier controller 113. The emitter of Q23 connects through a diode 172 to minus 22 volts. When Q23 is made conducting, as described hereinafter, the emitters of Q18, Q20, and Q22 are connected to the minus 22 volts so that the Darlington pairs are turned on and are in amplifying condition. They are off when the DME is in the track mode.

The control pulses for the Darlington pairs come from the cathodes of the zener diodes Z1, Z2 and Z3 through the following circuits. The cathode of Z1 is connected through a lead 173, a 2.2 microfarad capacitor, and a 2.7K current limiting resistor to the base of Q17. Note that when the Darlington pair is in amplifying condition Q17 is normally back-biased as a result of minus 22 volts applying a negative voltage to the base through a 4.7K resistor. Note that at this time the emitter of Q18 is at slightly less than minus 22 volts because of the slight voltage drop across the transistor Q23 and the diode 172. The input connections for Q19 and Q21 are similar to the one for Q17, the cathode of Z2 being connected through a lead 174, a 2.2 mf. capacitor, and a 2.7K resistor to the base of Q19; and the cathode of Z3 being connected through a lead 176, a 2.2 mf. capacitor, and a 2.7K resistor to the base of Q21.

In the search mode, the Darlington pairs are made effective to supply the desired power to the stepper motor for fast search. They are put in amplifying condition by Q23 of the search amplifier controller being turned on by the search control 82, as described later. When turned on, and with the search rate generator also turned on, the operation is as follows. Assume an input pulse has turned on Q15 of the ring counter. The cathode of zener diode Z2 rises to plus 13 volts from a potential near ground. It had been near ground potential because Q16 previously was on with its collector near ground, and with diode 147 conducting to clamp the cathode of Z2 near ground. This voltage step of 13 volts is coupled through lead 174 and the 2.2 mf. capacitor to the base of Q19, causing Q19 and Q20 to conduct. Thus, a pulse of current flows through the motor winding 134. On the next pulse from the search range generator, Q14 is turned on, and the cathode of Z1 rises to plus 13 volts, applying a pulse to the base of Q17. Thus, the pair Q17, Q18 are made conducting and a pulse of current flows through motor winding 129. On the next pulse Q16 turns on, the pair Q21, Q22 conduct, and a pulse of current flows through motor winding 139. The operation then repeats.

Refer now to the control of the search amplifier controller 113 by the search control 82. As previously described with reference to FIG. 4, when the DME is in the track mode, Q12 of the search control 82 is off. Its emitter is then negative enough so that, by way of lead 112, a diode 177 in the search amplifier controller 113 (FIG. 5) is cut off so that there is no forward bias on Q23 and it is cut off. Therefore, as previously described, the Darlington pairs cannot operate.

When the DME goes into the search mode, Q12 of search control 82 (FIG. 4) becomes conducting, and its emitter goes to about minus 5 volts. Diode 177 of the search amplifier controller 113 (FIG. 5) now conducts and Q23 is forward-biased whereby the Darlington pairs of the search amplifier 121 are put in operating condition.

As previously stated, the search amplifier located between the ring counter and the stepper motor may be omitted. Such an arrangement with the ring counter feeding directly into the stepper motor during search as well as during track is shown in FIG. 6. Suitable ring counters are known in the art. In the arrangement of FIG. 6, the counter is designed to supply more power to the stepper motor than the ring counter of FIG. 5 will supply. In FIG. 5, the use of the search amplifier permits the use of a comparatively low power ring counter.

The sequence of operation of the DME through its four modes of operation will now be summarized.

(I) *Track mode.*—A sufficient number of successive reply pulses have passed through the range gate 56 so that Q7 of the gated pulse counter 63 is biased off, cutting off Q8 in memory control 81 and turning on Q10 in memory control 81 so that its collector is at plus 20 volts.

The PRF is low since diode CR5 in the modulator trigger generator 23 is held back-biased by the plus 20 volts on the collector of Q10.

The time constant of the discharge circuit of counter store capacitor 83 is long, since diode 85 is back-biased by the plus 20 volts from the collector of Q10.

The stepper motor 46 is being driven by the output of error detector 55 through the ring counter 54 to hold the range gate coincident with the reply pulses.

Meanwhile memory capacitor 93 in memory control 81 is being charged negative. It charges to a maximum in about 10 seconds.

(II) *Proportional memory mode.*—Upon loss of reply signals, counter store capacitor 83 in the gated pulse counter loses its charge and it swings negative to make Q7 conduct.

The collector of Q7 is now near ground potential and memory capacitor 93 of memory control 81 is discharging, and the DME is in the memory mode.

The PRF is still low, as in track, since Q10 of the memory control is still on.

The time constant of the discharge circuit of counter store capacitor 83 is still long, as in track.

There being no reply signals, and random squitter pulses being blocked by counter gate 62, the ring counter and stepper motor are no longer driven; the range gate pulse holds in its last position, this being position memory. With a memory of about 10 seconds and at maximum aircraft speed, the range gate is not moved enough so that reply pulses fail to be coincident with range gate pulse if they return in 10 seconds or so.

Memory is a maximum of about 10 seconds. It is less if the DME is in track less than 10 seconds, in which case memory capacitor 93 of the memory control receives less charge and therefore is discharged to the search level quicker.

(III) *Search mode.*—In ten seconds or less memory capacitor 93 of memory control 81 discharges enough to put a positive voltage on the base of Q8 to make it conduct. Q9 of the memory control turns on, Q10 of the memory control turns off, and its collector is substantially at ground potential since it is connected to ground through the flag alarm solenoid 101.

In the search control 82, Q11 turns on since Q7 of the gated pulse counter is now on (with its collector near ground potential) so that Q11 is forward biased by minus 18 volts through the 82K resistor, Q11, and the diode 108.

Q12 also turns on since the collector of Q11 and, therefore, the base of Q12 are near ground potential so that said base is positive with respect to the negative emitter. The emitter and collector of Q12 go to about minus 5 volts.

The minus 5 volts on the collector of Q12 back-biases the diode 116 in the search rate generator, and it oscillates to drive the ring counter and the stepper motor in search. The DME is now in the search mode. Any random ground station squitter pulses which are coincident with the range gate are blocked from the error detector and servo system by the counter gate 62.

The search amplifier 121 has also been put into operation because the minus 5 volts now on lead 112 removes the back-bias from diode 177 in the search amplifier controller 113 and forward biases Q23, its emitter being at minus 22 volts.

The PRF is high since diode CR5 in the modulator trigger generator is conducting. CR5 is conducting because memory control transistor Q10 is now off and its collector is at ground potential, thus putting the leads 104 and 29 at ground potential.

The discharge time constant of counter store capacitor 83 is fast since the diode 85 is conducting. Diode 85 is conducting because leads 106 and 104 from the collector of Q10 are essentially at ground potential, and the junction of the 3.3K and 6.8K resistors (and the cathode of diode 85) is more negative than the anode of diode 85 during search because of random ground station squitter pulses passing through the range gate 56. In the particular circuit illustrated, the diode 85 would be cut off by a volt or two during search in the absence of squitter pulses, but squitter pulses are always present in sufficient numbers to charge capacitor 83 enough to hold the diode 85 conducting.

When reply pulses return and three or four successive reply pulses pass through the range gate 56, the DME goes into the acquisition mode.

(IV) *Acquisition mode.*—Upon return of reply pulses, when three or four successive reply pulses pass through the range gate 56, Q7 cuts off and its collector goes to minus 20 volts. This minus 20 volts cuts off diode 108 in the search control 82, cutting off Q11 and Q12. The collector of Q12 goes to plus 18 volts; this makes diode 116 conduct and stops the search rate generator 60. The counter gate 62 is opened by the minus 20 volts on the cathode of diode 88 and passes reply pulses to the error detector 55.

Thus, in acquisition the ring counter and the stepper motor are driven by either increase-range or decrease-range pulses from the error detector 55, not by the search rate generator.

During search, memory capacitor 93 of the memory control 81 was in the uncharged state. As soon as Q7 cut off (putting the DME into acquisition), the negative voltage on its collector began to charge capacitor 93. When capacitor 93 charges sufficiently, it cuts off Q8 of the memory control. This takes about 0.40 second and is the acquisition period.

During the acquisition period, the PRF and the discharge time constant of the counter store capacitor 83 are still high and fast, respectively (as in search), since Q10 is still in its off (search) condition for this 0.40 second period.

At the end of this 0.40 second period, Q8 is cut off and the DME is thrown into the track mode by the following sequence:

Q9 cuts off and Q10 turns on. The collector of Q10 goes to plus 20 volts. This plus 20 volts through diode 107 holds Q11 and Q12 of the search control off during track, and also during the memory period. With Q12 held off, the search rate generator is held off during the track and memory modes.

Also, when Q10 turns on, the plus 20 volts at its collector back-biases CR5 in the modulator trigger generator to decrease the PRF, and back-biases diode 85 in the gated pulse counter to increase the discharge time constant of capacitor 83.

Thus the DME is now back in the track mode.

What is claimed is:

1. Distance measuring equipment (DME) comprising means for transmitting interrogation pulses and means for receiving reply pulses in response to transmission of said interrogation pulses, means for producing a range gate pulse that is shiftable in time with respect to an interrogation pulse,
a bidirectional ring counter,
means for driving said ring counter in one direction in response to reply pulses occurring simultaneously with a portion of the range gate pulse that is to one side of the center of the range gate pulse and for driving said ring counter in the other direction in response to reply pulses occurring simultaneously with a portion of the range gate pulse that is to the other side of the center of the range gate pulse,
a stepper motor,
means coupling said ring counter to said motor for stepping said motor in one direction in response to said ring counter being driven in one direction and for stepping said motor in the other direction in response to said ring counter being driven in the other direction
and means for shifting the timing of said range gate pulse as a function of the rotation of said motor to make said DME automatically track in range.

2. Distance measuring equipment (DME) comprising means for transmitting interrogation pulses and means for receiving reply pulses in response to transmission of said interrogation pulses;

means for producing a range gate pulse that is shiftable in time with respect to an interrogation pulse;
means for producing a ramp signal that occurs simultaneously with said range gate pulse;
error detector means having two output leads, said reply signals and said ramp signal being applied to said error detector means, said error detector means supplying said reply pulses to one error detector output lead in response to said reply pulses occurring simultaneously with a portion of said ramp signal that is to one side of the center of said ramp signal and for supplying said reply pulses to the other error detector output lead in response to said reply pulses occurring simultaneously with a portion of said ramp signal that is to the other side of the center of said ramp signal,
a stepper motor,
means for stepping said motor in one direction in response to reply pulses appearing on said one of said error detector output leads and for stepping said motor in the other direction in response to reply pulses appearing on said other of said error detector output leads, said motor making one step in response to each reply pulse appearing on an error detector output lead,
and means for shifting the timing of said range gate pulse and of said ramp signal as a function of the rotation of said motor to make said DME automatically track in range.

3. In distance measuring equipment (DME) that comprises means for transmitting interrogation pulses and means for receiving reply pulses in response to transmission of said interrogation pulses, and that further comprises means for producing a range gate pulse that is shiftable in time with respect to an interrogation pulse and means for producing a ramp signal that occurs simultaneously with said range gate pulse;

an error detector to which said reply signals and said ramp signal are applied, said error detector having two output leads,
said error detector including means for supplying said reply pulses to one error detector output lead in response to said reply pulses occurring simultaneously with a portion of said ramp signal that is to one side of the center of said ramp signal and also including means for supplying said reply pulses to a second error detector output lead in response to said reply pulses occurring simultaneously with a portion of said ramp signal that is to the other side of the center of said ramp signal.

4. In distance measuring equipment (DME) that comprises means for transmitting interrogation pulses and means for receiving reply pulses in response to transmission of said interrogation pulses, and that further comprises means for producing a range gate pulse that is shiftable in time with respect to an interrogation pulse and means for producing a ramp signal that occurs simultaneously with said range gate pulse;

an error detector to which said reply signals and said ramp signals are applied, said error detector having two output leads,
said error detector including means for supplying said reply pulses to one error detector output lead in response to said reply pulses occurring simultaneously with a portion of said ramp signal that is to one side of the center of said ramp signal and also including means for supplying said reply pulses to a second error detector output lead in response to said reply pulses occurring simultaneously with a portion of said ramp signal that is to the other side of the center of said ramp signal, said error detector also including means for preventing said reply pulses from appearing on either of said output leads when said reply pulses occur simultaneously with a portion of said ramp signal on either side of but close to the center of said ramp signal whereby said error detector has a dead zone.

5. Distance measuring equipment (DME) comprising means for transmitting interrogation pulses and means for receiving reply pulses in response to transmission of said interrogation pulses;

means for producing a range gate pulse that is shiftable in time with respect to an interrogation pulse;

means for producing a ramp signal that occurs simultaneously with said range gate pulse;

error detector means having two output leads, said reply signals and said ramp signal being applied to said error detector means, said error detector means supplying said reply pulses to one error detector output lead in response to said reply pulses occurring simultaneously with a portion of said ramp signal that is to one side of the center of said ramp signal and for supplying said reply pulses to the other error detector output lead in response to said reply pulses occurring simultaneously with a portion of said ramp signal that is to the other side of the center of said ramp signal, a bidirectional ring counter having two input leads and a plurality of output leads, said ring counter being of the type that is driven in one direction in response to pulses applied to one of its input leads whereby pulses appear on its output leads in succession in a certain sequence, and being of the type that is driven in the opposite direction in response to pulses applied to its other input lead whereby pulses appear on its output leads in succession in the opposite sequence, means connecting said two input leads of the ring counter to the two output leads, respectively, of said error detector, a stepper motor, means connecting the output leads of the ring counter to said stepper motor for stepping said motor in one direction in response to reply pulses appearing on one of said error detector output leads and for stepping said motor in the other direction in response to reply pulses appearing on the other of said error detector output leads, said motor making one step in response to each reply pulse appearing on an error detector output lead, and means for shifting the timing of said range gate pulse and of said ramp signal as a function of the rotation of said motor to make said DME automatically track in range.

6. Distance measuring equipment (DME) comprising means for transmititng interrogation pulses and means for receiving reply pulses in response to transmission of said interrogation pulses, means for producing a range gate pulse that is shiftable in time with respect to an interrogation pulse, a bidirectional ring counter, means for driving said ring counter in one direction in response to reply pulse occurring simultaneously with a portion of the range gate pulse that is to one side of the center of the range gate pulse and for driving said ring counter in the other direction in response to reply pulses occurring simultaneously with a portion of the range gate pulse that is to the other side of the range gate pulse, a stepper motor, means coupling said ring counter to said motor for stepping said motor in one direction in response to said ring counter being driven in one direction and for stepping said motor in the other direction in response to said ring counter being driven in the other direction, and means for shifting the timing of said range gate pulse as a function of the rotation of said motor to make said DME automatically track in range, said DME further comprising a search rate generator for producing output pulses occurring at a higher repetition frequency than said reply pulses, and means for supplying said output pulses to said stepper motor to drive it in one direction in response to said DME being switched into a search mode as a result of loss of reply pulses.

7. Distance measuring equipment (DME) comprising means for transmitting interrogation pulses and means for receiving reply pulses in response to transmission of said interrogation pulses;

means for producing a range gate pulse that is shiftable in time with respect to an interrogation pulse;

means for producing a ramp signal that occurs simultaneously with said range gate pulse;

error detector means having two output means, said reply signals and said ramp signal being applied to said error detector means, said error detector means supplying said reply pulses to one error detector output lead in response to said reply pulses occurring simultaneously with a portion of said ramp signal that is to one side of the center of said ramp signal and for supplying said reply pulses to the other error detector output lead in response to said reply pulses occurring simultaneously with a portion of said ramp signal that is to the other side of the center of said ramp signal, a stepper motor, means for stepping said motor in one direction in response to reply pulses appearing on one of said error detector output leads, means for stepping said motor in the other direction in response to reply pulses appearing on the other of said error detector output leads, said motor making one step in response to each reply pulse appearing on an error detector output lead, means for shifting the timing of said range gate pulse and of said ramp signal as a function of the rotation of said motor to make said DME automatically track in range, said DME further comprising a search rate generator for producing output pulses occurring at a higher repetition frequency than said reply pulses, means for supplying said output pulses to said stepper motor to drive it in one direction in response to said DME being switched into a search mode, and means including a gate means responsive to the coincident occurrence of both said range gate pulse and said reply pulses for automatically switching said DME into said search mode when said coincident occurrence fails to occur for a given time.

8. The invention according to claim 7 wherein said search rate generator includes means for causing its output pulses to recur at an increasing repetition frequency up to a maximum frequency in response to said DME being switched into said search mode whereby said motor is caused to rotate at high speed.

9. Distance measuring equipment (DME) comprising means for transmitting interrogation pulses and means for receiving reply pulses in response to transmission of said interrogaiton pulses, and further comprising means for producing a range gate pulse that is shiftable in time with respect to an interrogation pulse, a ranging unit for controlling the timing of said range gate pulse, range driving means including a stepper motor for selectively driving said ranging unit at either a comparatively high speed or at a comparatively low speed, said range driving means further including means for causing said motor to make one step in response to each reply pulse during said driving at a comparatively low speed, mode switching means for automatically switching the DME into an automatic track-in range mode in response to successive received reply pulses being and remaining coincident with said range gate pulse for at least a first given time and including means for selecting the low speed drive of the ranging unit and including means for causing interrogation pulse transmission to occur at a comparatively low pulse repetition frequency, said mode switching means automatically switching the DME from the track-in-range mode to a memory mode in response to the failure of said reply pulses to remain coincident with said range gate pulse, said mode switching means automatically switching the DME from the memory mode to a search-in-range mode upon said failure of reply pulses to remain coincident with said range gate pulse continuing for a second given time, as well as selecting the high speed drive of said ranging unit and causing interrogation pulse transmission to occur at a comparatively high pulse repetition frequency during said search in range mode, and said mode switching means automatically switching the DME from the search-in-range mode to an acquision mode in response to the receipt of reply pulses that are coincident with said range gate pulse for a time less than said first given time as well as selecting said low speed drive of the ranging unit and maintaining the interrogation pulse transmission at a comparatively high pulse repetition frequency during said acquisition mode, said DME switching from the acquisition mode to the track-in-range mode at the end of the acquisition mode period if successive received reply pulses continue to remain coincident with the range gate pulse for said first given time.

10. The invention according to claim 9 wherein said mode switching means comprises a pulse counter to which received reply pulses coincident with said range gate pulse are applied, said counter including a capacitor which is step-charged by each successive one of said reply pulses, said capacitor having a discharge circuit which has a certain time constant, the output of said pulse counter being connected to control, in part, said mode switching means, and means for making said time constant comparatively long while the DME is transmitting interrogation pulses at said low pulse repetition frequency and for making said time constant comparatively short while the DME is transmitting interrogation pulses at said high pulse repetition frequency.

References Cited by the Examiner
UNITED STATES PATENTS 2,671,895   3/1964   Perkins _____ 343—7.3
3,246,324   4/1966   Price _____ 343—7.3

CHESTER L. JUSTUS, *Primary Examiner.*

T. H. TUBBESING, *Assistant Examiner.*